(12) United States Patent
James et al.

(10) Patent No.: US 8,545,692 B2
(45) Date of Patent: Oct. 1, 2013

(54) APPARATUS AND METHOD FOR ELECTROCHEMICAL MODIFICATION OF CONCENTRATIONS OF LIQUID STREAMS

(76) Inventors: Patrick Ismail James, Madison, WI (US); George Stejic, Arlington, VA (US)

( * ) Notice: Subject to any disclaimer, the term of this patent is extended or adjusted under 35 U.S.C. 154(b) by 398 days.

(21) Appl. No.: 13/117,769

(22) Filed: May 27, 2011

(65) Prior Publication Data
US 2012/0298527 A1 Nov. 29, 2012

(51) Int. Cl.
C25B 9/16 (2006.01)
(52) U.S. Cl.
USPC .......................................... 205/753; 205/348
(58) Field of Classification Search
USPC ................................................ 205/348, 753
See application file for complete search history.

(56) References Cited

U.S. PATENT DOCUMENTS

| | | | | |
|---|---|---|---|---|
| 3,941,669 A | * | 3/1976 | Bharucha et al. | 205/348 |
| 7,744,734 B2 | * | 6/2010 | Li | 204/284 |

\* cited by examiner

*Primary Examiner* — Keith Hendricks
*Assistant Examiner* — Salil Jain
(74) *Attorney, Agent, or Firm* — Miodrag Cekic; Intellectual Property Strategists, LLC

(57) ABSTRACT

An apparatus and a method for electrochemical modification of liquid streams using at least one anode and cathode assemblies arranged to contain liquid electrolytes anolyte and catholyte, a plurality of electrically conducting anode and cathode particulates forming anode and cathode particulate beds, and current feeder and current collector devices in contact with the particulate bed, where the anode particulates and cathode particulates are in motion substantially independent of bulk electrolytes flow.

18 Claims, 7 Drawing Sheets

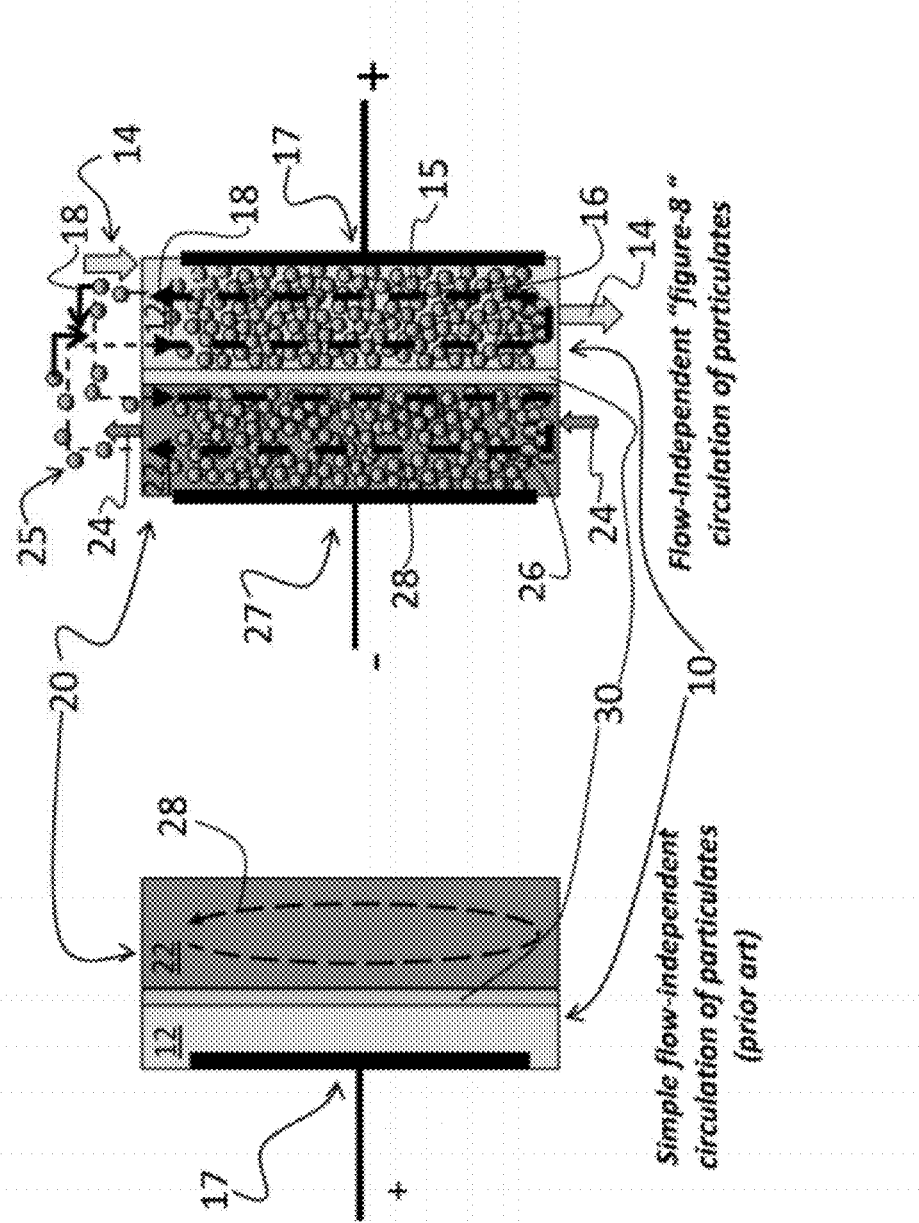

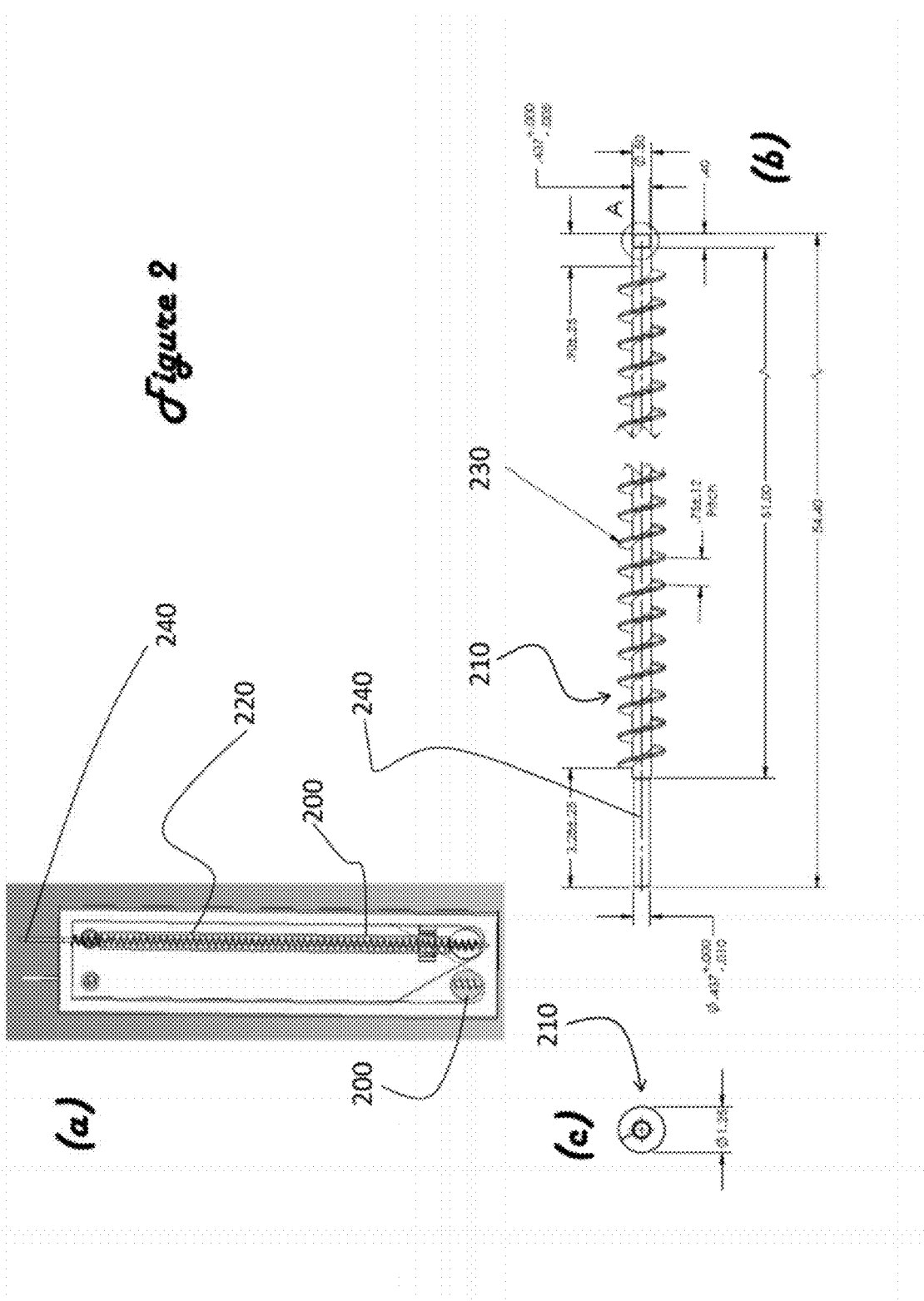

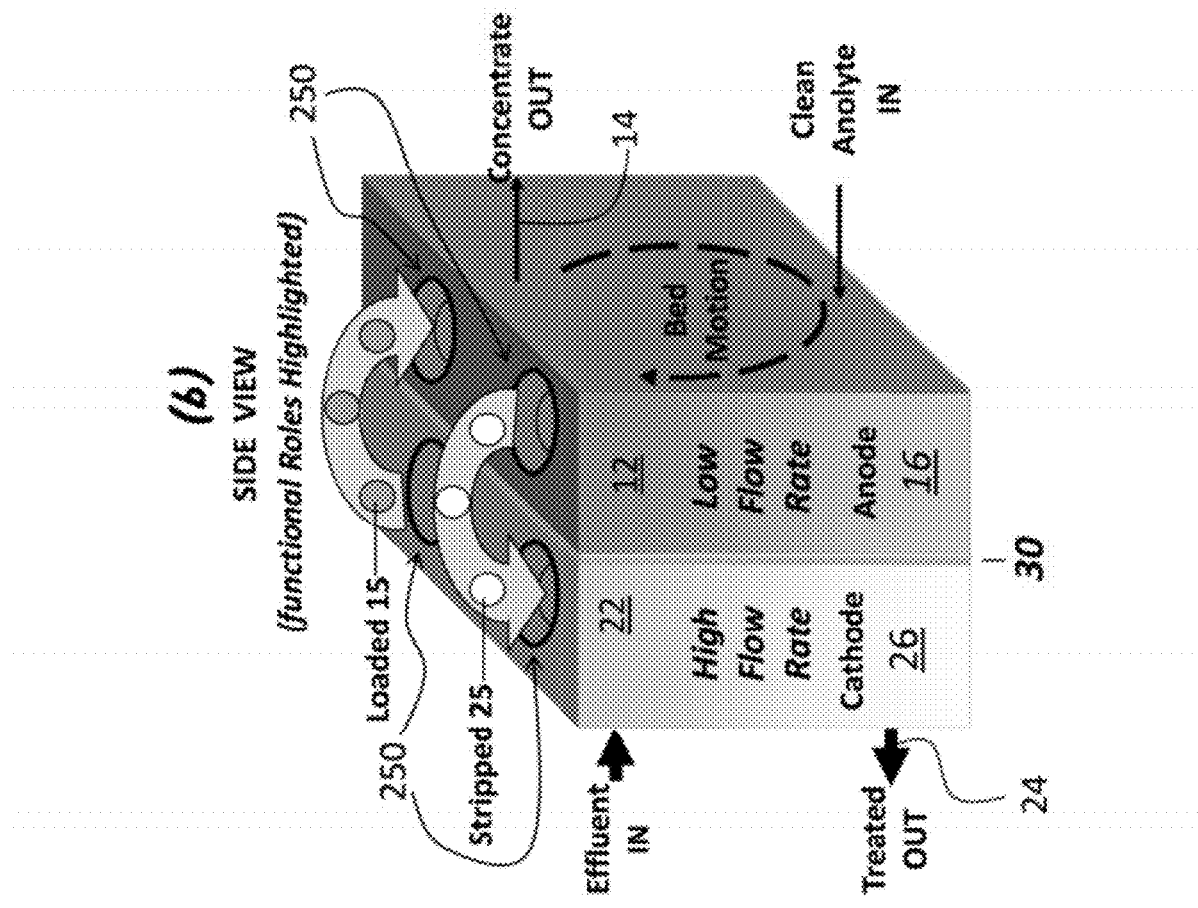
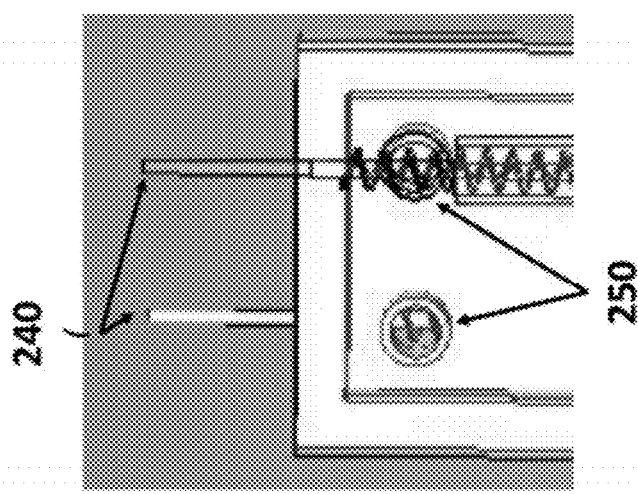

APPARATUS AND METHOD FOR ELECTROCHEMICAL MODIFICATION OF CONCENTRATIONS OF LIQUID STREAMS

GOVERNMENT LICENSE RIGHTS

This invention was made and reduced to practice with US government support under National Institutes of Health (NIH) Small Business Innovation Research (SBIR) grant 1 R43 ES013622-01A1. The US government has certain rights in the invention.

CROSS REFERENCE TO RELATED APPLICATIONS

This application is based upon and claims benefits of copending U.S. patent application Ser. No. 13/020,447 entitled "A METHOD FOR ELECTROCHEMICAL MODIFICATION OF LIQUID STREAMS" filed with the U.S. Patent and Trademark Office on Feb. 3, 2011, and copending U.S. patent application Ser. No. 11/623,658 entitled "APPARATUS AND METHOD FOR ELECTROCHEMICAL MODIFICATION OF LIQUID STREAMS" filed with the U.S. Patent and Trademark Office on Jan. 16, 2007; which are incorporated herein by reference.

FIELD OF THE INVENTION

The invention relates to an apparatus and a method for electrochemical modification of concentrations of constituents of liquid streams which contain organic and/or inorganic impurities. More precisely, the invention is concerned with an electrolytic cell technology with potentials to modification of concentrations of constituents found in liquid streams and economically feasible extraction of selected dissolved constituents for commercial applications.

BACKGROUND OF THE INVENTION

Contamination of liquid streams with various organic and inorganic pollutants is a serious global environmental problem affecting environment quality and represents significant threat to human health and safety. Substantial heavy metal contamination of aquatic environments arises from commercial mining and metal extraction processes, surfaces modification and protection processes, or communal and industrial waste sites resulting from a variety of active or defunct industrial fabrication and manufacturing activities. Similarly, significant organic water pollutants, like aliphatic, aromatic, or halogenated hydrocarbons and phenols are frequently associated with oil exploration, extraction and refining, chemicals production, or large-scale farming and food processing.

In addition to potential far significant environmental damage, polluted liquid streams represent dilute sources of desirable raw materials like heavy metals and metal oxides. For example, the Berkeley Mine Pit in Butte, Mont. alone represents an estimated 30 billion gallons of acid mine drainage which contains ~180 ppm of copper along with other metals and thus could yield up to 22,000 tons of pure copper by use of a small treatment facility.

An economically relevant group of prior art methods of removal of heavy metal ions from liquid solutions is based on chemical precipitation. This process is generally burdened by complexity, high cost, clear preference for extremely large facilities and high-volume operations, and efficiency decrease with decrease in concentration of pollutants. One disadvantage concerns the resulting byproduct of precipitated sludge which becomes a concentrated yet mixed contaminant source of the toxins in the source material. The sludge mandates further processing and costly long term disposal as a highly toxic waste. Many similar disadvantages burden alternative heavy ion removal methods that may incorporate: filtration, ion exchange, foam generation and separation, reverse osmosis, or combinations of listed processes.

Considerable market research conducted by many strategic copper industry consultants indicated that high grade ore reserves are becoming exhausted. Producers increasingly may need a way to use their existing recovery equipment and processes to recover copper from their plentiful but presently unusable low-grade ore. Currently, they can't economically use the ore as resultant process streams containing the copper extracted from the ore are too weak and need strengthening (concentrating) to allow practical conventional copper production.

In contrast, the extraction technologies enabled by several aspects of the current invention may be adapted to alleviate at least some of the above considerations. Additional features of the current invention, for example, may contribute to the feasibility of modifying prior art electrowinning technology so that it can be used to economically concentrate copper generated in low-grade process streams instead of simply removing it. In general, the disclosed embodiments of the copper extraction technology may prepare a process stream so the customer can produce new copper from currently inaccessible sources with existing in-place processing infrastructure, equipment, and processes.

Some recent market research [e.g. Jan Mueller-Volmer, "Private Market Study Performed for the PI," *EnviroNet: Water and Environment Specialists*: September 2009] estimate existence of 70 active copper mines using heap leach operations to generate ¼ of the world's copper production (9,000,000,000 lbs/yr). Moreover, heap leach use for copper production is growing as ore grades decline from resource depletion. Additionally, nearly ⅓ of the world's total copper reserves are locked in low-grade porphyry deposits considered be economically unsuitable for the prior art methods of extraction [e.g. in S. Wang, "Copper leaching from chalcopyrite concentrates," *J. Minerals, Metals, Materials Society*, 55(7), p. 48. (2005); D. A. Singer, V. I. Berger, B. C. Moring, "Porphyry Copper Deposits of the World: Database and Grade and Tonnage Models," *U.S. Department of the Interior*, Report 2008-1155 (2008).]

The present invention may provide some innovative features for unlocking this vast and vitally needed resource. Typical mines contain significant amounts of their copper in such unviable ores. This invention may allow the use of this "waste" ore and thereby increase average heap leach mine output by 25% and thus globally yield 3 Billion lbs/yr of newly recoverable copper.

Furthermore, additional features of embodiments of the current invention may allow for practical metal recovery from: Acid Rock Drainage (ARD), heavy metal and radionuclide contaminated sites, and metal contaminated industrial effluents such as electrowinning, plating plant, pickling operations, and circuit board manufacture (etching) discharges.

SUMMARY OF THE INVENTION

The present invention considers an apparatus for electrochemical modification of liquid streams employing at least one electrolytic cell which comprises: at least one anode assembly including at least one anode compartment arranged to contain: a liquid electrolyte anolyte, a plurality of electrically conducting anode particulates forming an anode particulate bed, and a current feeder device in at least intermittent contact with the anode particulate bed, where the anode particulates are in motion and the anode particulates motion substantially independent of bulk anolyte flow, at least one cathode assembly including at least one cathode compartment arranged to contain: a liquid electrolyte catholyte, a plurality of electrically conducting cathode particulates forming a cathode particulate bed, and a current collector device in at least intermittent contact with said cathode particulates where the cathode particulates are in motion and the particulates motion is substantially independent of bulk catholyte flow, at least one separator arranged: to separate the cathode compartment and the anode compartment, to confine the anode particulates bed and the cathode particulates bed, and to constrain the electrolytes flows through the anode particulate bed and the cathode particulate bed, and to facilitate ionic conduction of current between the anode particulate bed and the cathode particulate bed, at least one particulate conveyance system arranged to manipulate the anode particulate bed and the cathode particulate bed motions, at least one system for substantially independent circulations of the liquid electrolyte anolyte and liquid electrolyte catholyte through the electrolytic cell, and at least one system for driving unidirectional electric current supported by the liquid streams from the anode assembly through the anolyte and the separator into the catholyte and to the cathode assembly. The particulate beds are manipulated such that after participating in the target redox reactions, the particles are separated from their respective liquid stream (electrolyte), separated from electrical contact with their respective current feeder or collector device, and then passed to the other cell half in a controlled and balanced fashion. This allows the same particulates in the particulates electrode bed to act; at different times while continuously circumnavigating a looped pathway, to act as either an anode or cathode depending on where a particle is in the overall pathway circuit.

The method of present invention comprises: providing an electrolytic cell, circulating liquid stream undergoing modification through said electrolytic cell, activating a particulates conveyance system to form the moving cathode particulates bed immersed in the catholyte and transporting the cathode particles bed substantially independently from catholyte circulation, activating a particulates conveyance system to form the moving anode particulates bed immersed in the anolyte and transporting the anode particles bed substantially independently from anolyte circulation, bringing cathode particulates bed in at least intermittent contact with the current collector device, bringing anode particulates bed in at least intermittent contact with the current feeder device, energizing the system for conducting unidirectional electric current to drive current supported by the liquid streams from the anode current feeder into the anode particulates bed and through the anolyte and the separator and into the catholyte and to the cathode particulates bed and to the current collector device during the contact between the cathode particulates and the current collector device and sustaining the achieved current conduction long enough to electrochemically react at least detectable quantities of targeted constituents of liquid streams undergoing modifications.

BRIEF DESCRIPTION OF THE DRAWINGS

The above and other embodiments, features, and aspects of the present invention are considered in more detail in relation to the following description of embodiments shown in the accompanying drawings, in which:

FIG. 1. is a schematic cross-sectional side view of devices in accordance with prior art (a) and current invention (b).

FIG. 2. is a schematic cross-sectional view of one embodiment of electrolytic cell in accordance with the current invention.

FIG. 3. is a schematic cross-sectional front view (a) and side view (b) of an embodiment of the device in accordance with the current invention.

Like reference numerals identify like parts throughout the drawings.

DETAILED DESCRIPTION OF THE INVENTION

Figure 4:
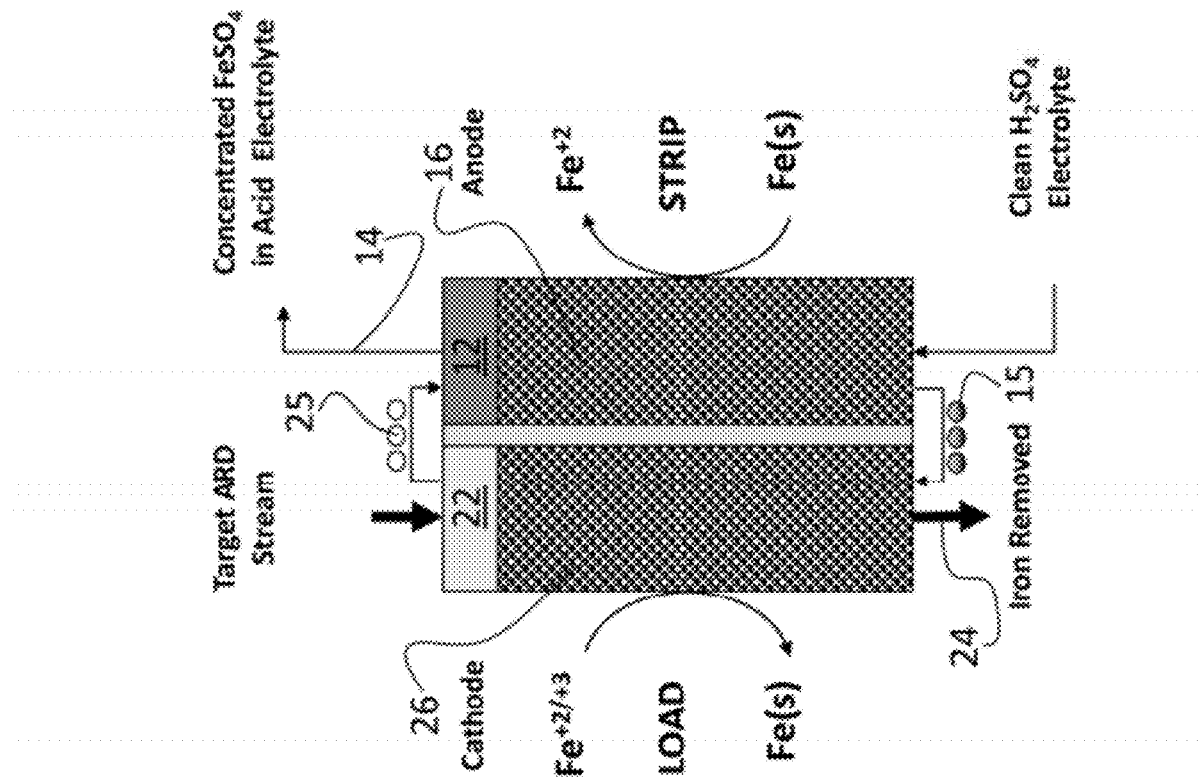
FIG. 4. is a schematic cross-sectional front view of a different embodiment of the device in accordance with the current invention.

The invention summarized above may be better understood by referring to the following description, which should be read in conjunction with the accompanying drawings. This description of an embodiment, set out below to enable one to build and use an implementation of the invention, is not intended to limit the invention, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form. Similar to the inventions in the applications incorporated by reference above (first paragraph), embodiments of this instant invention can be of planar, circular, and concentric tubular or other configurations containing two or mote separate electrolyte chambers as required to address different application needs.

One embodiment of the instant invention used as an example for clarity is based on a two chamber electrolytic cell with two separate electrolyte flows separated by an ion conducting membrane. The two chamber electrolytic cell utilizes high surface area (relative to the electrodes mass) particulate electrodes where particulates are arranged to be transported from one chamber to the other (on a part-by-part basis essentially independently from the flows of respective electrolytes through the two chambers.) The particulates of the particulate bed electrodes move in a 3D-deformed "figure-eight" fashion passing from side to side and back again while separating from the associated electrolyte and breaking electrical contact with either the current feeder or current collector (as appropriate) before moving to the other chamber of the cell. In this manner, two high surface area moving bed particulate electrodes are sandwiched together with one acting as the cathode (metal plating, bed loading or contaminant reduction) and the other acting as the anode (metal stripping, bed unloading or contaminant oxidation). Thus the cathode removes metals or electrochemically reduces contaminants from its electrolyte stream and the anode discharges the recovered/loaded metals into its (separate) stream or oxidizes contaminants present in the electrolyte stream.

This embodiment retains advantages of decoupled flows, electrode dendrite, occlusion, and fouling resistance, high current densities, and high removal efficiencies and low concentrations as disclosed in the related applications incorporated by reference above. Since charge balance requires that numbers of individual reduction and oxidation events are equal, when applied to metal recovery the metal removed essentially equals the metal discharged. This process may be compared conceptually to a large (essentially filling the entire electrolytic cell) Coulombic sensor. This may result in an effective separation of the targeted metals from a waste stream and which are then deposited into the target stream. By keeping the electrolyte flow volume for the anode side small (minimal catholyte carryover should occur), one may transfer the amount of metal removed from the effluent (catholyte) to the anolyte with a resulting concentration increase in the anolyte that may be commensurate to the treated effluent volume divided by the anolyte volume. In this manner the electrochemical cell acts like a dissolved metal concentration step-up transformer. By adjusting the relative catholyte and anolyte stream flow rates (again relatively independently from the particulates' motions), the target metal may effectively be purified and concentrated (i.e. an electrochemical concentrator). The particular embodiment's unit may be compared to an electrical transformer for transforming voltage and currents. Here a high flow/low concentration stream can be converted into a low flow/high concentration stream.

This embodiment exhibits several significantly improved features including simultaneous particulates loading and refreshing while supporting the common flow of serial current. In turn, this feature may allow for the continuous oxidation or reduction of substances which normally coat or foul the electrodes and it may allow continuous use of substrates with high hydrogen overpotentials for unprecedented process control—the surface is continuously re-exposed during the stripping phase or de-fouled by the reverse redox reaction. By balancing the bed transport rate and the plating rate, one may continuously plate the target metal onto the substrate base (as opposed to plating the target metal onto itself). This may allow for decoupling of the kinetics of hydrogen evolution from the plating kinetics to gain additional process control. Practically it may allow for metals like Nickel, Tin, Cadmium, Cobalt, Indium, etc. to be recovered much more efficiently (like Zinc—which itself has a high hydrogen evolution overpotential) than achievable by the standard prior art technology.

To achieve the targeted modification of the electroplating kinetics, the plating rate and particulate electrode residence time in cathode chamber of the above embodiment may be balanced so that the coated target metal does not form a blocking plated layer (beyond the continuous layer of sufficient thickness that the surface Work Function is simply that of the plated metal one simply plates on the target metal and the kinetics become that inherent for the target metal). Since continuous layers typically form when thin films are ~10 nm thick, the electrowon layer may be kept thinner than a few continuous layers so that the surface Work Function is a composite of the Work Function of the substrate material and that of the plated material. Thus the turnover rate for the bed (loading to stripping) is arranged to be sufficiently fast to keep the plated layer below this critical thickness limit.

Manipulation of the plating kinetics for electrowinning may allow one to avoid parasitic reactions like hydrogen evolution which reduces the plating Faradaic Efficiency for the target metal. By utilizing high hydrogen evolution overpotential substrates, hydrogen evolution at negative potentials can be suppressed to allow efficient plating of more challenging (less noble) metals in the cell. Balancing the bed transport rate and the plating rate (cathode) keeps the plated layer below the critical thickness and continuously re-exposes the substrate surface during the stripping phase (anode) so that one is continuously plating the target metal onto the substrate base (as opposed to plating the target metal onto itself).

Similarly, the electrolyte stream separations maintained by the particular embodiment may allow for easier to control and ensures that the stripping action is separated from the plating action. Thus by keeping the strip portion electrolyte volume small (recirculating it) one can concentrate and accumulate the target ions in the anolyte. Essentially, one can create a much more concentrated and cleaner stream from a dilute and mixed stream. The metal product in the Product stream can then be readily recovered by various conventional means.

A simplified schematic side view cross-section of the electrolytic cell in accordance with one embodiment (FIG. 1(b)) of the current invention in comparison with a cell (FIG. 1(a)) in accordance with previously disclosed embodiments (e.g. U.S. patent applications Ser. Nos. 13/020,447 and 11/623, 658) is given in FIG. 1. Both FIG. 1 illustrated electrolytic cells incorporate an anode assembly 10 and a cathode assembly 20 separated by a separator 30. The FIG. 1 illustrates only unit cells (both in the case (a) of previous art and in the case of the instant invention (b)) which may be arranged into more complex multiple cell electrolytic devices having parallel, serial, or combined configurations of different embodiments.

The at least one anode assembly 10 of the illustrated embodiment includes at least one anode compartment 12 arranged to contain and defines a flow boundaries of a liquid electrolyte anolyte 14 (having the direction and intensity of the flow as indicated by arrows), a plurality of electrically conducting anode particulates 15 forming an anode particulates bed 16, and a current feeder device 17 in at least intermittent contact with the anode particulate bed 16. The anode particulates 15 are actuated to move in a substantially random fashion, relative to each other, but having an average velocity component as represented by arrows 18, substantially independent of bulk anolyte flow 14.

Similarly, the at least one cathode assembly 20 of the illustrated embodiment includes at least one cathode compartment 22 arranged to contain and defines a flow boundaries of a liquid electrolyte catholyte 24 (having the direction and intensity of the flow indicated by arrows), a plurality of electrically conducting cathode particulates 25 forming a cathode particulate bed 26, and a current collector device 27 in at least intermittent contact with the cathode particulate bed 26. The cathode particulates 25 are actuated to move in a substantially random fashion, relative to each other, but having an average velocity component as represented by arrows 28, substantially independent of bulk catholyte flow 24.

It may be observed in FIG. 1(b) that anode particulates 15 and cathode particulates 25 are arranged and driven to move in a complex continuous 3D motion which resembles a "figure-8" when projected on an appropriate plane (2D). It may be noted that in the actual device paths of anode particulates 15 and cathode particulates 25 can intersect only inside the compartments 12 and 22. It also may be noted that, although the particulates may originate from the common supply stock, the chemical composition, especially on the particulates exterior, depends significantly on the particulates' positions along the pertinent circulation paths. In general, the anode particulates 15 exiting the anode compartment 12 may be considered to be relatively depleted of metals of interest relative to the cathode particulates 25 exiting the cathode compartment 22.

The at least one separator 30 is arranged to separate the cathode compartment 22 and the anode compartment 12, to confine the anode particulates bed 16 and the cathode particulates bed 26, and to constrain the electrolytes flows 14 and 24 through the anode particulate bed 16 and the cathode particulate bed 26 (in the same order), and to facilitate ionic conduction of current between the anode particulate bed 16 and the cathode particulate bed 26.

One embodiment having two particulate conveyance systems 200 is illustrated in FIG. 2 in which (a) illustrates a cross-section of the electrolytic cell at the plane of symmetry of one conveyance system 200 (of two illustrated), one of which has been arranged to manipulate the anode particulates bed 16 (while another of which has been arranged to manipulate the cathode particulates bed 26) motion. The conveyance system 200 utilizes a rotating screw type auger conveyor 210 to transfer the electrode particulates from one end of the electrolytic cell to the other independent of the electrolyte flow. A variety of auger conveyor 210 positions and configurations, as well as other direct mechanical conveyance modes may be used (buckets, belts, etc). Here the auger conveyor 210 is positioned in a containment tube 220 outside of the main particulates beds 16 and 26 to provide a parallel but separate path for the conveyance of the particles of the particulates beds 16 and 26. In FIG. 2(b)-(c) detailed orthogonal projections of an exemplary driving auger conveyor 210 are illustrated. The driving auger conveyor 210 is arranged to interact with particulates 15 (25) confined in the containment tube 220 which opens to the bottom of the particulates bed chamber. Rotating the driving auger 210 causes a helicoidal auger flute 230 to transfer an average vertical momentum to the particulates 15 (25) when spun, for example, via a belt and pulley system (not illustrated) attached to an extension 240. The average vertical momentum eventually (usually after several direct or indirect interactions of particulates 15 (25) with the helicoidal auger flutes 230) transports the particulates 15 (25) into a vicinity of transfer openings 250 allowing for transfer of at least a portion of particulates 15 (25) from the anode compartment 12 (the cathode compartment 22) into the cathode compartment 22 (the anode compartment 12).

Another illustration of the above embodiment is disclosed in FIG. 3. FIG. 3(a) corresponds to the illustrations in FIG. 2, disclosing an enlarged rendering of the transfer openings 250. FIG. 3(b) schematically illustrates the functions of transfer openings 250 allowing for independent transfer of particulates 15 (stripped during passage through the anode particulates bed 16) in a continuous looping pathway from the cathode particulates bed 26 (loaded stage) to the anode particulates bed 16 by transporting them in opposite directions.

Various additional examples of systems for substantially independent circulations of the liquid electrolyte anolyte 14 and liquid electrolyte catholyte 24 through the electrolytic cell are disclosed in related applications incorporated above by reference. It may be of interest to recapitulate that, both, anolyte 16 and catholyte 26 particulate beds circulations are decoupled and substantially independent from the circulations of pertinent liquid anolyte 14 and liquid catholyte 24 streams. As in the related applications, the separation of the electrolytes and the particulates circulations may be utilized for achieving additional process efficiency (at least because of the reduction in electrolyte pumping requirements) and flexibility of operation that may result from substantially independent optimization of pertinent rates of transport of electrolytes and particulates through individual electrolytic cells.

Similarly, as disclosed above and in the incorporated applications, various systems for driving unidirectional electric current supported by the liquid streams from the anode assembly through the anolyte and the separator into the catholyte and to the cathode assembly may be utilized in different embodiments of the current invention.

A variety of electroactive solutions comprising solvent, electrolyte, and possibly supporting electrolytes meeting chemical and electrochemical potential window stability criteria may be used in different embodiments of the current invention. The anolyte and catholyte can be similar or different depending on the targeted application. Specifically, as disclosed in related applications, initial demonstrative work for reducing the technology to practice used separate portions of identical starting composition samples of the same electrolyte as the starting anolyte and catholyte. A synthetic high sulfate, acidic, acid rock drainage solution was prepared using water as the solvent as this represents the most common solvent. The conically conducting species of the electrolyte were provided by added ionizing compounds which dissolved in the solvent. While a plethora of suitably soluble, conductive, and electrochemically stable compounds exist, initial work utilized copper sulfate pentahydrate in an acidic, high sulfate background as a model test solution. Here the sulfate anion was stable in the electrochemical potential window of interest and the cupric ion provided a model and readily plated target species for electrochemical reduction at the cathode. Oxidation of the plated metal (copper) to generate soluble cupric sulfate was targeted at the anode as the complimentary oxidation reaction to the targeted reduction process.

Also, as disclosed previously, several supporting electrolytes were also added to better mimic the composition of acid mine drainage. Sulfuric acid was added to lower the solution pH while sodium sulfate was added to increase the sulfate concentration to levels typical of actual acid mine drainage. As the sulfate and sodium are inactive in the potential window of interest, they act simply as supporting electrolytes. Similarly, while protons can be reduced to hydrogen at the cathode, except under mass transfer limitations, cupric ion reduction will dominate and the dissolved protons will effectively serve as supporting electrolyte ions. This allows the electrolytic cell to practically perform electrowinning to much lower concentrations than traditional spouted cells which are dominated by fluid pumping power costs at low target metal concentrations, as previously shown. One can note that the high copper removal efficiency is extended down ~20× vs. prior competing technologies to ~50 mg/L (50 ppm) at high current density (high removal rates).

One exemplary embodiment of the present invention incorporating electrolytic cells for targeted Acid Rock Drainage (ARD) iron removal and conversion into $Fe(SO_4)$ is schematically illustrated in FIG. 4. The cell may be operated to electrowin dilute iron on the cathode 26 from the target ARD 24 and then dissolve the plated iron as high concentration $Fe(SO_4)$ into the anolyte flow 14 as denoted in FIG. 4. This process may be controlled by the iron electrowinning (cathode reaction) and the overall merit of this method may measured by monitoring the overall iron processing efficiency and rate that can be achieved for ARD treatment and the ability to cost-effectively and practically harvest the $Fe(SO_4)$ product. Iron plating from acid is known to practitioners. In current state-of-the-art processes it may be experimentally verified iron metal plating from dilute (1000 ppm) $Fe^{+2}$ in a sulfuric acid background. The anode reaction is also well established and may occur spontaneously in Iron pickling baths where it yields large amounts of the target ferrous sulfate as a processing by-product. Nevertheless, Iron dissolution is anodically driven by biasing (as in the cell in accordance with the current invention), the favored reaction may generate the more easily formed $Fe^{+2}$ ($E°_{(ox)}$=+0.4 SHE) in preference to $Fe^{+3}$ ($E°_{(ox)}$=+0.04 SHE). In addition, the current invention enables an automatic and continuous product harvesting into the anolyte stream and allows for creation of highly concentrated $Fe(SO_4)$ product, such that separation of the solid and high-value $Fe(SO_4).7H_2O$ may be more easily achieved. This greatly enhances the process practicality and transforms the waste into a high value product whose value can exceed the processing cost.

Figure 5:
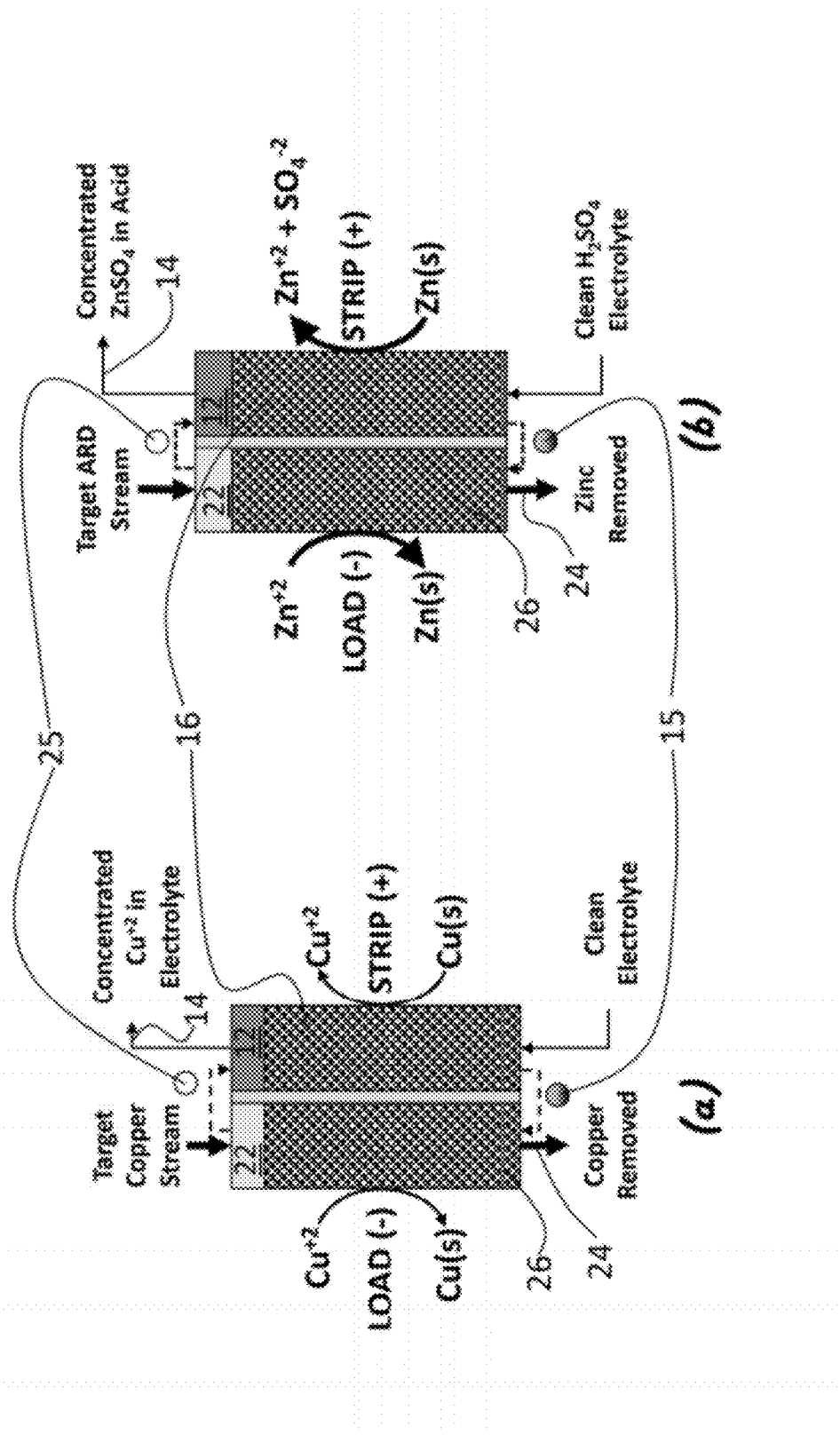
FIG. 5. is a schematic cross-sectional front view of additional different embodiments of the device in accordance with the current invention.

In FIG. 5, additional exemplary embodiments arranged for extracting Copper (FIG. 5(a)) from Copper ARD streams and extracting Zinc (FIG. 5(b)) as high value $ZnSO_4$ from Zinc containing ARD streams are schematically illustrated. As disclosed above, two high surface area moving bed particulate electrodes 16 and 26 are sandwiched together forming a common current path. One acting as the cathode 26 (supplying electrons ("−" charge) for metal plating and/or bed loading) and the other acting as the anode 16 (collecting electrons ("+" charge) for metal stripping and/or bed unloading) as illustrated in FIG. 5.

For Zinc-related exemplary embodiment in FIG. 5(b), rather than recover the zinc in its low-value pure metallic form, the new invention allows the creation and recovery of high value ZnSO4 which has sufficient value to easily cover processing costs. As a consequence, an economic process arranged to achieve a rapid and efficient ARD Zinc removal and to cost-effectively and practically harvest the $Zn(SO_4)$ product may be established in accordance to the current invention. The electrolyte flow may be well controlled so that essentially all of the target solution carrying substantially all available $Zn^{+2}$ ions may be forced through the active plating bed 26. The product metal concentrates in the anolyte stream 14 as a dissolved salt. Here highly concentrated $Zn(SO_4)$ product may be created so that high-value $Zn(SO_4).7H_2O$ can be more easily separated.

Figure 6:
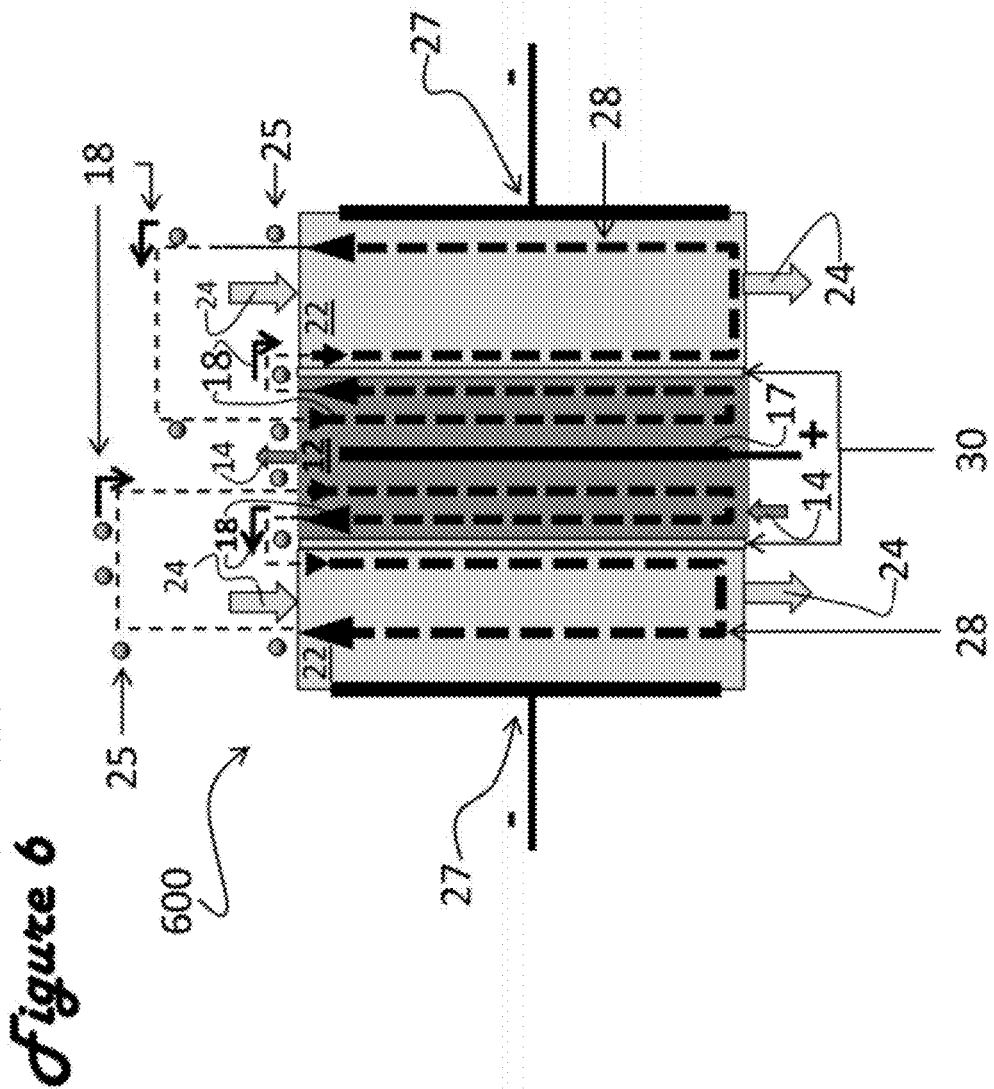
FIG. 6. is a schematic cross-sectional front view of another different embodiments of the device in accordance with the current invention.

The schematic illustrations of above-disclosed embodiments of the current invention the depiction of the electrolytic cell includes one anode compartment opposed by only one cathode compartment 22. In FIG. 6, a different embodiment having two cathode compartments coupled to the single anode compartment 12. This embodiment may be optimized for treatment of liquid streams characterized by relatively lower catholyte concentrations of the ions of interest. This feature may require relatively higher catholyte flows 24 in order to generate desirable anolyte flow 14. It may be noted that schematics in FIG. 6 omits many details disclosed in previous figures in order to emphasis directions of particulates' average velocity components 18 and 28.

Figure 7:
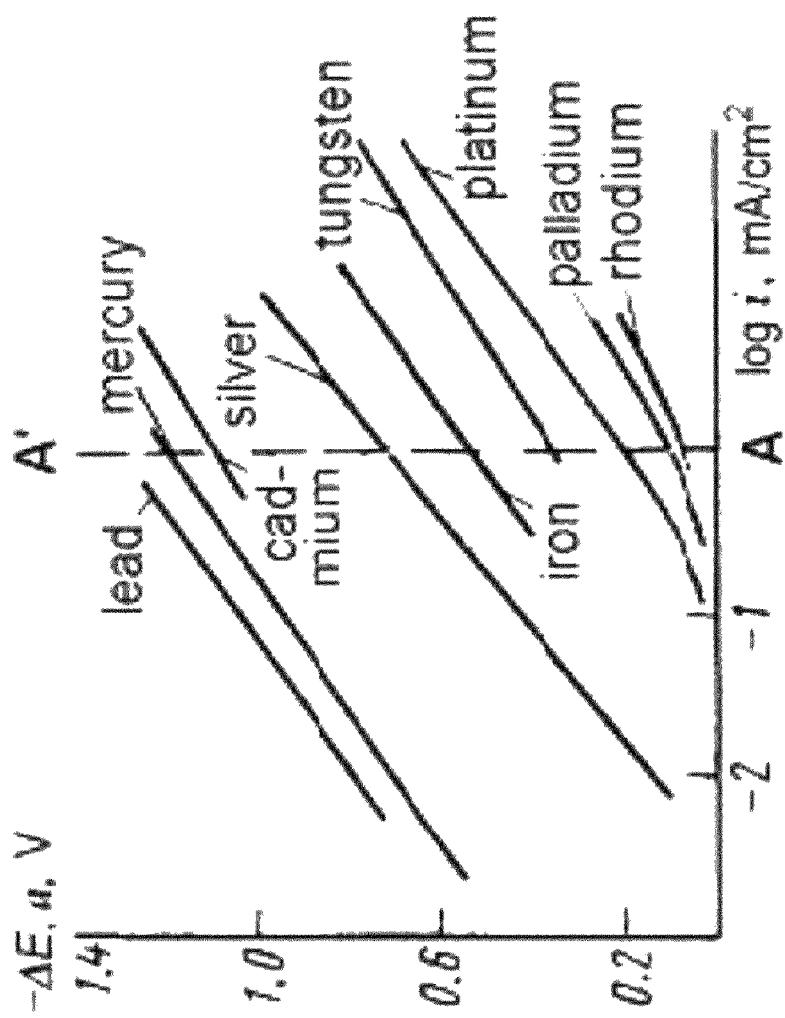
FIG. 7. is a graphic illustration of hydrogen evolution overpotential versus electrode current density for various elements in accordance with previously published information.

One known feature of known electrolytic cells is the possibility for generation undesirable acid fumes and/or explosive mixtures of $H_2$ and $O_2$ gases. A particular challenge is the generation of hydrogen ($H_2$) on the cathode as a parasitic reaction when trying to plate metals whose thermodynamic plating potential is below the hydrogen evolution potential. In this case, plating occurs as a competition between the desired metal plating reaction and the parasitic hydrogen evolution reaction the details of which is controlled by the relative reaction kinetics. Rapid hydrogen evolution results in low plating efficiencies and production of dangerous quantities of highly reactive hydrogen. Placement of electrolytic cells under an enclosed canopy hood to contain and vent both acid fumes and any gases is known in prior art as a brute force method of dealing with the challenges of the parasitic reaction. In this invention the innovative cell design and operation provide a powerful new option to allow the control of the challenging reaction kinetics so that may be controlled such that normally inaccessible metals more noble than hydrogen can be effectively and practically electrowon for processing by DEMET™. Utilization of particulate electrodes containing material exhibiting very high Hydrogen evolution overpotential (FIG. 7) further reduces hydrogen generation since the plated material is stripped off on the anode cell half and thus regenerates/re-exposes the substrate. For example, an embodiment incorporating a stainless steel auger 200 and 2 mm dia. lead shot (#7 shot-gun ammo projectiles) as the particulate electrode 15 may be used as substrate particles in the cathode 26. Since Lead (see FIG. 7) exhibits a hydrogen evolution overpotential substantially equal to −1.3V(SHE) (at current density i=1 mA/cm$^2$; log(i)=0 in FIG. 7) plating of metals with plating potentials greater than −1.3 V(SHE) should occur with minimal hydrogen evolution. Thus the ability to efficiently plate metals with plating potentials below 0.0 V(SHE)—the thermodynamic hydrogen evolution potential—becomes possible. In this manner, the kinetics of hydrogen evolution can be controlled by the choice of substrate material of the particulates electrode. Based on the overpotential reasoning, one may conclude that apparatus and methods in accordance with this embodiment may be used for electrowinning (from solutions and/or low-grade ores) a plurality of metals including, but not limited to, Lead, Nickel, Cobalt, Tin, Cadmium, Indium, Iron, Zinc, Chromium, Arsenic, Manganese, and respective mixtures of listed elements.

It is frequently desirable, for an efficient and consistent function of an electrolytic cell, that current feeder 17 and/or current collector 27 devices having at least one solid state surface do not lose appreciable exposed material over short time periods to the red/ox reaction on exposed surfaces inseparable from the proper function of any electrolytic cell. This is particularly important for the current feeders 17 functionally exposed to oxidation reactions in the anode compartment 12. Such current feeders and/or current collectors are considered to have geometrically stabile surfaces.

Many geometrically stable surfaces which may incorporate Platonized Titanium, Niobium coated Copper, and conductive or semi-conductive oxide coated conductive substrates or combination of this and other refractory materials are known to the practitioners. Such surfaces may incorporate relatively smooth active surfaces, or textured and porous surfaces that benefit from the additional surface area introduced by the added structural feature topography.

In addition, the surface materials comprising lead and lead alloys may be considered geometrically stable over the electrochemical-process-relevant periods of time since such surfaces exhibit only relatively gradual and substantially uniform corrosion. The corrosion process of the lead comprising surfaces in acidic sulfate solutions is especially slow in processes related to electrochemical modifications of liquid streams and consequently is well established and widely used in industrial processes like conventional electrowinning and electroplating. For the purpose of the present invention the surfaces comprising lead and lead alloys are included in the set of geometrically stable anodes.

Separators 30 with surfaces that define planes are depicted in FIG. 1. Because of the influence of gravity on the particulates electrode particles' convection, the preferred orientation of separator surfaces that define the plane is with the plane parallel to the vertical axis, while the preferred orientation of the cylindrically-symmetric separator surfaces is with the cylindrical axis parallel to the vertical axis. It is recognized that any non-horizontal orientation, with the separator surfaces planes and/or cylindrical axis forming non-zero angles with horizontal planes, will function in accordance with the present invention.

The preferred cathode particulates conveyance system 200 that manipulates particulates motion is a mechanical system in the general form of the screw type conveyor 210 shown schematically in FIG. 2. Another recently developed and commercially available alternative is very similar to the conventional screw conveyor except that the screw is fixed and the containment tube rotated to effect particulate transfer. In the depicted embodiment speed of rotation of the system 200 may be in the range from 1 RPM to 1000 RPM.

Additional embodiments of the particulates conveyance systems including, but not limited to, at least one particulate conveyance system comprises at least one particulates conveyor selected from the set consisting of a screw type conveyor, a moving bucket type conveyor, a moving belt type conveyor, and a combination type conveyor incorporating any combination of the screw, the moving bucket, or the moving belt, are disclosed in more details in the above-incorporated related applications.

The resistivity of the current carrying component of particulates suitable for practical utility can range from about 1 nano ohm centimeters to about 20,000 nano ohm centimeters. The cathode particulates can comprise common metals such as Copper, Aluminum, Lead, Nickel, Iron, mild steel, Bismuth, Antimony, stainless steel, Zinc, Titanium, Silver, Gold, Platinum, Palladium, Tin, Tungsten, Carbon, and it's mixtures, alloys, and combinations and others. Less common materials for the cathode particles such as conducting polymers, ceramics, semiconductors, and combinations of suitable substrate materials exhibiting appropriate conductivity would also work with the present invention.

Products of electrochemical reactions associated with the proper function of an electrolytic cell may accumulate in the cell and interfere with long term cell functionality. Also, products of electrochemical reactions may be of commercial interest as produced or represent raw materials for further processing. The controlled accumulation of products of electrochemical reactions can occur as an attachment and deposition on the cathode particulates, a sedimented material concentrated at lower parts of the cell chambers, or as incremental rise of concentration of materials dissolved in the electrolyte or the presence of suspended product particulates or insoluble liquid or gaseous phase product.

Processes of controlled removal of products of electrochemical reactions can be performed continuously during the operation of the electrolytic cell as customary in the art of electrochemical disinfection or pollution removal, or using batch process as customary in art of conventional electrowinning of metals. Both modes of operation are in accordance with the present invention.

The present invention has been described with references to the exemplary embodiments arranged for different applications. While specific values, relationships, materials and components have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with such underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

We claim:

1. An apparatus for electrochemical modification of liquid streams employing at least one electrolytic cell which comprises at least one anode assembly including at least one anode compartment arranged to contain a liquid electrolyte anolyte, a plurality of electrically conducting anode particulates forming an anode particulate bed, and a current feeder device in at least intermittent contact with the anode particulate bed, where the anode particulates are in motion and the anode particulates motion is substantially independent of the bulk flow of the anolyte;

at least one cathode assembly including at least one cathode compartment arranged to contain: a liquid electrolyte catholyte, a plurality of electrically conducting cathode particulates forming a cathode particulate bed, and a current collector device in at least intermittent contact with said cathode particulates where the cathode particulates are in motion and the particulates motion is substantially independent of the bulk flow of the catholyte;

at least one separator arranged to separate the cathode compartment and the anode compartment, to confine the anode particulates bed and the cathode particulates bed, and to constrain flows of the electrolytes through the anode particulate bed and the cathode particulate bed, and to facilitate ionic conduction of current between the anode particulate bed and the cathode particulate bed;

at least one particulate conveyance system arranged to manipulate the anode particulate bed and the cathode particulate bed motions;

at least one system for substantially independent circulations of the liquid electrolyte anolyte and the liquid electrolyte catholyte relative to each other through the electrolytic cell; and at least one system for driving unidirectional electric current supported by the liquid streams from the anode assembly through the anolyte and the separator into the catholyte and to the cathode assembly; and wherein the at least one particulate conveyance system is arranged to selectively transport the anode particulates from the at least one anode compartment into the at least one cathode compartment and the cathode particulates from the at least one cathode compartment into the at least one anode compartment substantially independently from the motions of the liquid electrolyte anolyte and the liquid electrolyte catholyte.

2. The apparatus of claim 1 wherein the liquid electrolyte anolyte and the liquid electrolyte catholyte comprise ionizable compounds dissolved in supporting solutions.

3. The apparatus of claim 2, wherein the supporting solutions are chosen from the set of solutions consisting of liquid organic compounds, liquid inorganic compounds, and mixtures of liquid organic compounds and liquid inorganic compounds.

4. The apparatus of claim 2, wherein the supporting solutions are chosen from the set of solutions consisting of water, methanol, ethanol, all isomers of propanol, acetonitrile, carbon dioxide, ammonia, methylethyl ketone, tetrahydrofuran, dimethylsulfoxide, and mixtures thereof.

5. The apparatus of claim 1, wherein the at least one anode assembly incorporates the current feeder device having at least one solid surface.

6. The apparatus of claim 1, wherein at least a portion of the plurality of electrically conducting anode particulates and the plurality of electrically conducting cathode particulates comprise constituents having absolute value of hydrogen evolution overpotential equal or exceeding 0.0 V(SHE) at current density of substantially 1 mA/cm$^2$.

7. The apparatus of claim 1, wherein the at least one cathode assembly incorporates the current collector device having at least one solid surface.

8. The apparatus of claim 5, wherein the solid surface is geometrically stable.

9. The apparatus of claim 7, wherein the solid state surface is geometrically stable.

10. The apparatus of claim 1, wherein the separator incorporates at least one surface arranged to define at least one plane.

11. The apparatus of claim 10, wherein the at least one plane is oriented non-horizontally.

12. The apparatus of claim 1, wherein the at least one particulate conveyance system is a mechanical system that interacts with the anode and the cathode particulates via direct mechanical interaction.

13. The apparatus of claim 1, wherein the at least one particulate conveyance system comprises at least one particulates conveyor selected from the set consisting of a screw type conveyor, a moving bucket type conveyor, a moving belt type conveyor, and a combination type conveyor incorporating any combination of the screw, the moving bucket, or the moving belt.

14. The apparatus of claim 1, wherein the anode and the cathode particulates comprise materials arranged to conduct electric charges chosen from a set of electrically conductive and semi conductive materials consisting of elements, metals, alloys, compounds, ceramics, organic polymers, and inorganic polymers.

15. The apparatus of claim 1, wherein the cathode particulates and the anode particulates comprise materials with resistivity values of less than 20,000 nano ohm centimeters.

16. The apparatus of claim 15, wherein the cathode particulates and the anode particulates comprise materials with resistivity values of less than 5,000 nano ohm centimeters.

17. The apparatus of claim 16, wherein the cathode particulates and the anode particulates comprise materials with resistivity values of less than 1,000 nano ohm centimeters.

18. The apparatus of claim 1, wherein the at least one anode assembly, the at least one cathode assembly, the at least one separator, and the at least one system for driving unidirectional electric current are arranged to support a common loop of current simultaneously flowing through the anode particulate bed and the cathode particulate bed.

* * * * *